United States Patent [19]

Funabashi et al.

[11] Patent Number: 4,690,237

[45] Date of Patent: Sep. 1, 1987

[54] REAR STRUCTURE FOR MOTORCYCLES

[75] Inventors: Katsunori Funabashi; Tai Nakashima; Toshiyuki Yamada; Kazuo Morishima, all of Saitama, Japan

[73] Assignee: Honda Giken Kogayo Kabushiki Kaisha, Tokyo, Japan

[21] Appl. No.: 862,186

[22] Filed: May 9, 1986

Related U.S. Application Data

[63] Continuation of Ser. No. 608,830, May 10, 1984, abandoned.

[30] Foreign Application Priority Data

May 12, 1983 [JP] Japan ................................ 58-83294
May 12, 1983 [JP] Japan ................................ 58-83295

[51] Int. Cl.⁴ ............................................. B62J 7/04
[52] U.S. Cl. ................................ 180/219; 224/32 A; 224/275; 280/202; 280/289 A; 297/243; 297/417; 297/DIG. 9
[58] Field of Search ................... 180/219, 218, 205; 280/202, 289 A; 224/32 A, 31, 39, 42.42, 275; 297/243, 417, 188, 192, 195, 214, DIG. 9; 206/542, 235, 335; 116/45, 28 R; D12/158; 296/37.1; 362/80, 72, 73

[56] References Cited

U.S. PATENT DOCUMENTS

| D. 276,712 | 12/1984 | Kashio et al. ........................ D12/158 |
| 1,435,160 | 11/1922 | Hoegemann .................. 132/79 R X |
| 2,678,682 | 5/1954 | Thomas ........................ 224/275 X |
| 3,582,639 | 6/1971 | Chamberlain ......................... 362/80 |
| 3,625,347 | 12/1971 | Trammell, Jr. ..................... 224/275 |
| 3,788,532 | 1/1974 | Bish ...................................... 224/31 |
| 4,225,183 | 9/1980 | Hanagan et al. ................ 297/195 X |
| 4,501,384 | 2/1985 | Itoh ............................... 224/32 R X |
| 4,549,629 | 10/1985 | Komuro ............................... 180/219 |

FOREIGN PATENT DOCUMENTS

| 861731 | 11/1940 | France .............................. 224/32 R |
| 1248870 | 11/1960 | France .............................. 297/192 |

Primary Examiner—John J. Love
Assistant Examiner—Mitchell J. Hill
Attorney, Agent, or Firm—Sughrue, Mion, Zinn, Macpeak & Seas

[57] ABSTRACT

A rear structure for a motor cycle having a driver's seat and a rear rider's seat, comprises a rear trunk for receiving therein articles, a pair of armrests for bearing rear driver's elbows in a natural posture. The rear trunk includes a backrest for bearing at least a part of the rear driver's back. The armrests are provided independently of said rear trunk. In addition, various utility containers are provided in the rear structure.

9 Claims, 8 Drawing Figures

REAR STRUCTURE FOR MOTORCYCLES

This is a continuation, of application Ser. No. 608,830, filed May 10, 1984, abandoned

BACKGROUND OF THE INVENTION

The present invention relates to a rear structure for motorcycles.

In a rear structure for a motorcycle, there are provided a rear trunk, a backrest mounted on a front side of the rear trunk, and a headrest (if desired). In such a structure it is general that even if the backrest is mounted independently, the backrest is not higher than an top surface of the rear trunk. If the headrest is provided or instead thereof the height of the backrest is increased for the purpose of enhancing a touring feel, the rear space defined by the headrest or the backrest should be effectively utilized.

On the other hand, the rear trunk of the motorcycle is generally utilized for receiving therein various sized articles and tools together. In particular, there is a demand that a utility box for small articles such as a vanity set be provided in the rear structure for female riders.

SUMMARY OF THE INVENTION

An object of the present invention is to meet the above-noted requirements.

According to the present invention, there is provided a rear structure for a motor cycle having a driver's seat and a rear rider's seat, said rear structure comprising a rear trunk means for receiving therein articles, armrest means for bearing rear driver's elbows in a natural posture, said rear trunk means including a backrest means for bearing at least a part of the rear driver's back, and said armrest means being provided independently of said rear trunk means.

DETAILED DESCRIPTION OF THE PREFERRED EMBODIMENTS

Figure 1:
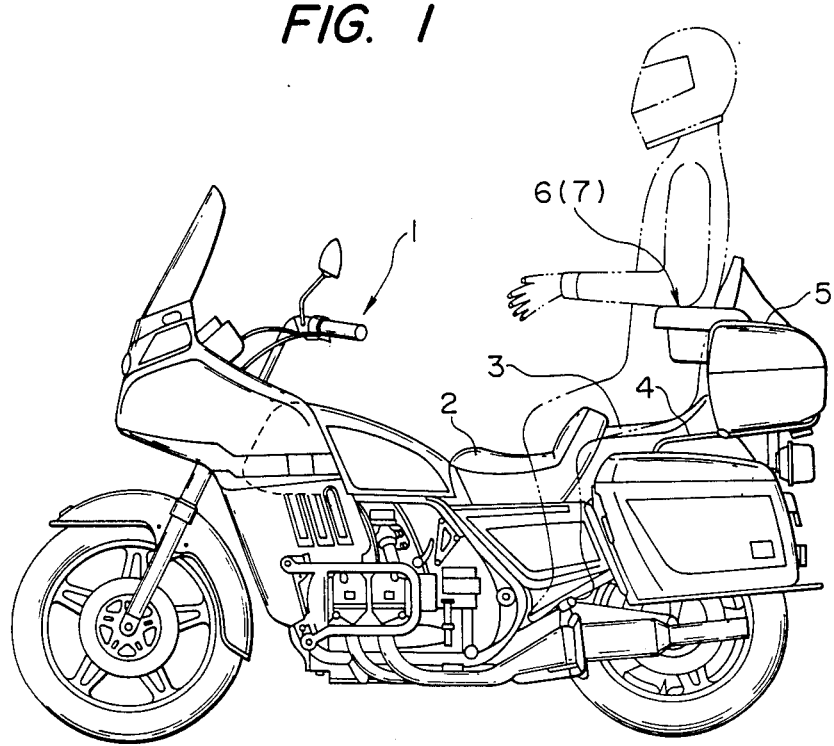
FIG. 1 is a side elevational view showing a motorcycle having a rear structure according to the invention.
Figure 2:
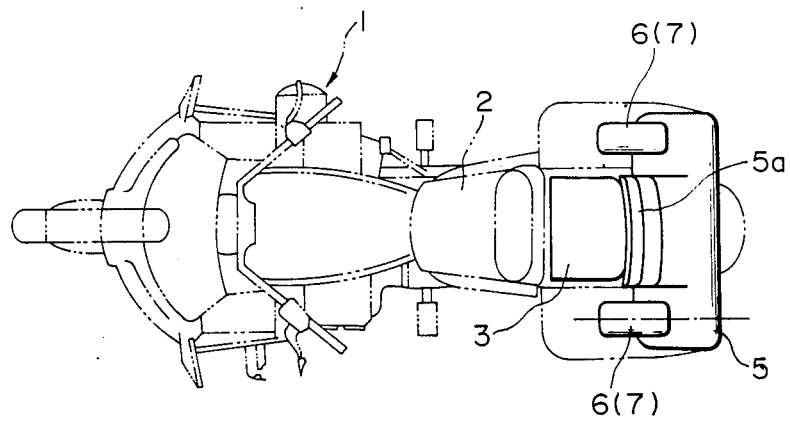
FIG. 2 is a plan view of the motorcycle shown in FIG. 1.

The present invention will now be described with reference to the accompanying drawings. In FIGS. 1 and 2, there is shown a rear structure for a motorcycle 1. A rear seat 3 is provided on the rear side of a front or driver's seat 2. A backrest 5a is provided at a rear side of the rear seat 3 for the sake of ensuring good riding feel and safety. The backrest 5a is secured to a front surface of a rear trunk 5 fixed to a motorcycle body frame 4. A pair of armrests 6, 6 are provided on both sides of a backrest 5a. The armrests 6, 6 are constructed so that elbows of the rear rider (indicated by dot-and-dash lines in FIG. 1) may be kept in a natural form. The armrests 6, 6, are preferably formed in a detachable fashion to be described. Various detachable structures of the armrests per se well known in the art are applicable. For example, the armrest structure may include a hinge mechanism (not shown) by which the armrests 6, 6 may be rotated, as desired, with respect to the frame 4, and the armrests may be turned back when the armrests are not used.

An open type armrest structure according to the invention will be described with reference to FIG. 3A. In FIG. 3A, the box 7a for receiving therein articles is fixed to the rear trunk by screws 7d, 7e. However, it is also possible to integrally form the box with rear trunk. Bearing seats 7a', 7b' are formed on the box 7a. As shown in FIG. 3A, support pins 7b', 7b' of an openable lid or cover 7b are carried on the bearing seat 7a', 7a'. Thus, the openable cover 7b is upwardly swingable. Furthermore, a fastening plate 7c for supporting the openable cover 7b and the box 7a are fixed together by screws 7e whereby the armrest 7 as a whole is fixed.

Figure 3B:
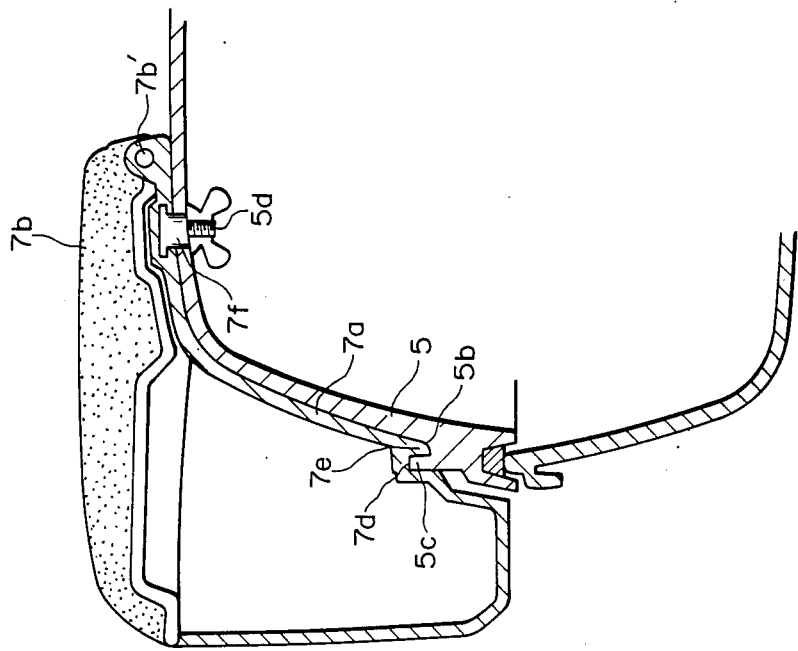
FIG. 3B is a cross-sectional view showing a modification of the armrest shown in FIG. 3A.
Figure 3A:
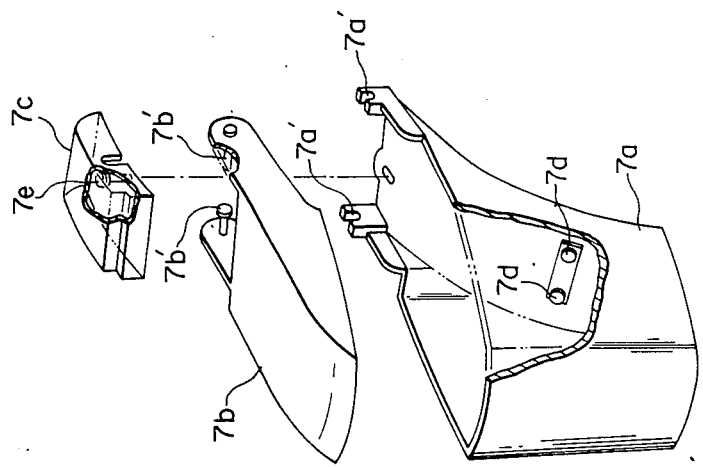
FIG. 3A is an exploded perspective view of an armrest shown in FIG. 1.

FIG. 3B shows a modification of the armrest structure shown in FIG. 3A. The structure shown in FIG. 3B including a hook engagement structure having a groove 7d and a projection 7e formed in the box 7a and an associated structure having a groove 5b and a projection 5b formed in the trunk 5. On the other hand, a screw-and-nut structure having a screw 7f and a nut 5d for fastening the armrest 7 to the trunk 5 is provided at a top portion of the trunk 5. With such a construction, the attachment/detachment of the armrest 7 may readily be carried out.

Figure 4A:
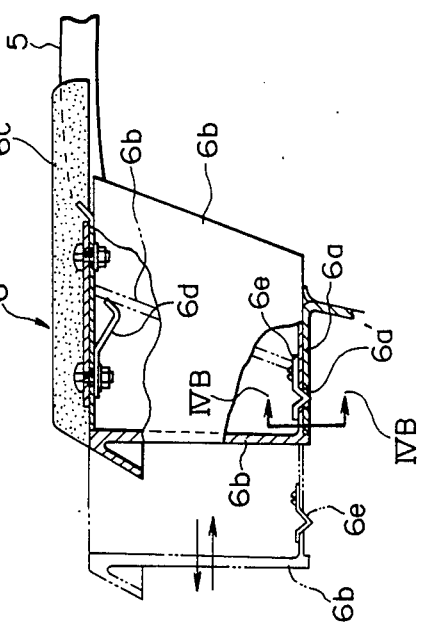
FIG. 4A is a fragmentary cross-sectional view showing another modification of the armrest according to the invention.
Figure 4B:
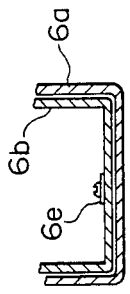
FIG. 4B is a cross sectional view taken along the line IVB—IVB of FIG. 4A.

In another type armrest structure according to the present invention shown in FIGS. 4A and B, a pair of armrests 6, 6 are provided on both sides of the backrest 5a. As shown in FIGS. 4A and B, an upwardly opened box-shaped case 6a is formed integrally with the rear trunk 5. A box 6b is slidingly moved, as indicated by the arrows, on the box-shaped case 6a like a drawer. An armrest portion 6c which has cushion material such as sponge or rubber on its upper side is provided on the upper surface of the case 6a. Also, to prevent the box 6b from falling appart from the case 6a, a stop member 6d such as a leaf spring is secured on the case 6a side. A spring stop 6e fixed to the box 6b is engaged with and disengaged from a hole 6a' formed in the bottom surface of the case 6a whereby the receiving position is determined.

Figure 5:
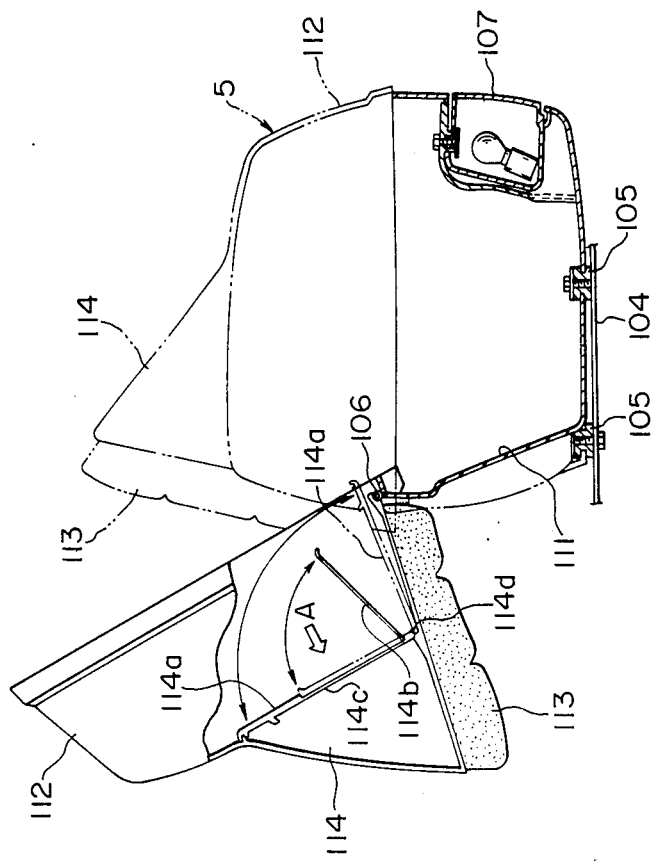
FIG. 5 is a fragmentary cross-sectional view showing a trunk shown in FIG. 1.

Referring now to FIG. 5, a rear trunk structure according to the invention will be described in detail. The rear trunk structure 5 comprises a box 11 fixed through damper members 105 to a mounting seat 104 of the motorcycle body frame 4 and an openable cover 112 hinged at a location 106 about the box 111. A backrest 113 which is higher in level than a top surface of the cover 112 is provided on the front side of the openable cover 112 and is rotatable together with the cover 112. An article receiving portion 114 is formed in a space corresponding to a height, of the backrest, exceeding the top surface of the cover 112. The article receiving portion 112 is formed in a triangular shape in cross section as shown. However, the portion 114 is not limited thereto. The openable cover 112 is integrally formed with the backrest 113 and the article receiving portion 114.

On the article receiving portion 114, there is provided a partitioning member 114a for partitioning the article receiving portion 114 from the cover 112. The partitioning member 114a is rotatably mounted at a hinge 114d. On the outer surface of the partitioning member 114a, there is further provided a smaller lid 114b which is also rotatably mounted on the partitioning member 114a. A mirror 114c a size of which is substantially the same as that of the openable lid 114b is built in the partitioning member 114a. The mirror is usefull for dressing. When the openable cover 112 is opened as indicated by a solid line in FIG. 5, the partitioning member 114a is exposed. Then, the partitioning member 114a is opened for taking a necessary particle and is again closed. When the lid 114b is opened, it is possible to see the mirror 114c from a direction as indicated by the arrow A. Incidentally, as another use of the structure, instead of the mirror 114c, a reflector such as a stop mark at night may be used.

Figure 6:
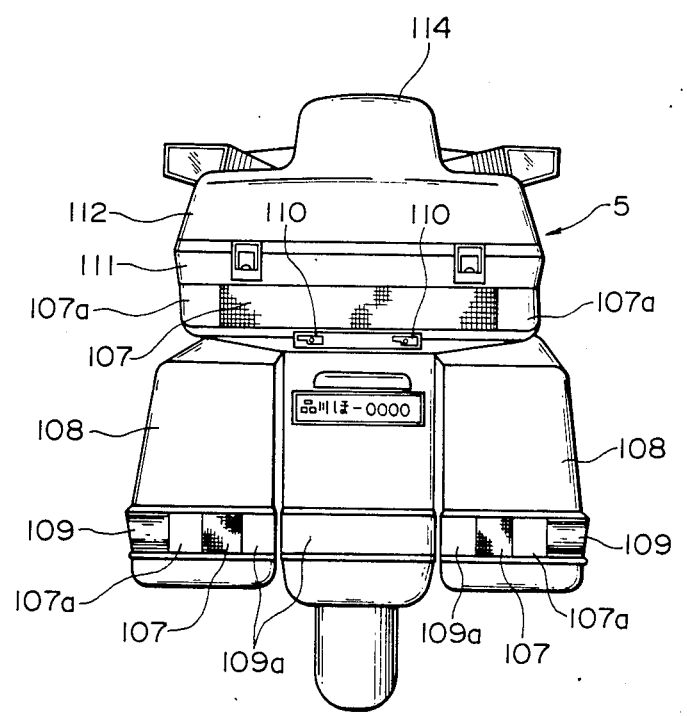
FIG. 6 is a rear view of the motorcycle shown in FIG. 1.

Such a structure allows the following additional arrangement. Since the rear trunk 5 may be enlarged in size, as shown in FIG. 2, electric means such as stop lamps 107 and reflectors 107a may be mounted in a unit fashion on a rear lower portion of the rear trunk 5. Thus, a double row arrangement may be attained together with a conventional arrangement composed of electric means such as stop lamps 107 and turn signal lamps 109 and reflectors 107a disposed therebetween. As shown in FIG. 6, since the stop lamps 107 and the tail lamps and the like are arranged at the rear side of the rear trunk 5, a visible ability of a vehicle running after the motorcycle is much more enhanced.

Also, conventionally, when a rider's helmet is out of use, it is suspended from a suitable position on one side of the motorcycle body. In such a structure, when a plurality of motorcycles are arranged in parallel for parking, the parking space much wider than expected is required. To obviate such a defect, according to the present invention, helmet locks 110 are located at the rear side of the rear trunk as showing in FIG. 6.

What is claimed is:

1. A rear structure for a motorcycle having dual seat structure comprising; a driver's seat and a rider's seat, said rear structure further comprising;

a rear trunk means for receiving therein articles, armrest means for bearing rider's elbows in a natural posture, said rear trunk means including a backrest means for bearing at lest a part of the rider's back, and said armrest means not integral with said rear trunk means; said armrest means including a pair of armrests, said armrests being each detachably coupled to said trunk means.

2. The rear structure according to claim 1, said armrests each having therein article receiving spaces.

3. The rear structure according to claim 1, said trunk signal lamps including a rear face on which electric means are provided.

4. The rear structure according to claim 1, said electric signal lamps being mounted on a rear face of said article receiving openable box.

5. The structure according to claim 4, said motorcycle including a pair of side containers having electric signal lamps mounted on their rear sides, said electric signal lamps of said trunk means forming with said electric signal lamps of said side containers, two horizontal signal rows.

6. The rear structure according to claim 1, said armrest means including an open box and a hinged armrest cover member.

7. The rear structure according to claim 1, said armrest means including an openable box, a drawer contained in said openable box, first stop means for holding said drawer in a drawn position and a second stop means for holding said drawer in a closed position.

8. A rear structure for a motorcycle having rear seat structure comprising; a driver's seat and a rider's seat, said rear structure further comprising; a rear trunk means for receiving therein articles; armrest means for bearing rider's elbows in a natural posture; said rear trunk means including, backrest means for supporting at least a portion of a rider's back, said armrest means not integral withs aid rear trunk means; said armrest means including a pair of armrests and said armrests being each detachably coupled to said trunk means; a maximum distance between said armrests, in a transverse direction, smaller than a maximum width of said trunk means; each of said armrests including an article receiving portion provided below a level of each of said armrests; sid rear trunk means including an article receiving openable box and a hinged cover; each of said armrests arranged to open in a first direction with respect to said motorcycle, said rear trunk means arranged to open in a second direction with respect to said motorcycle, and wherein said first and second directions are opposite to each other; each of said armrests provided with ahinge; said backrest means including a backrest formed on a front face of said cover, said backrest extending along a rider's back to exceed, in level, a top portion of said cover; said rear trunk means further includes an article receiving container for supporting said backrest and said article receiving container integral with said cover.

9. The rear structure according to claim 8, said article receiving container including an inner led, said lid having a mirror.

* * * * *